UNITED STATES PATENT OFFICE.

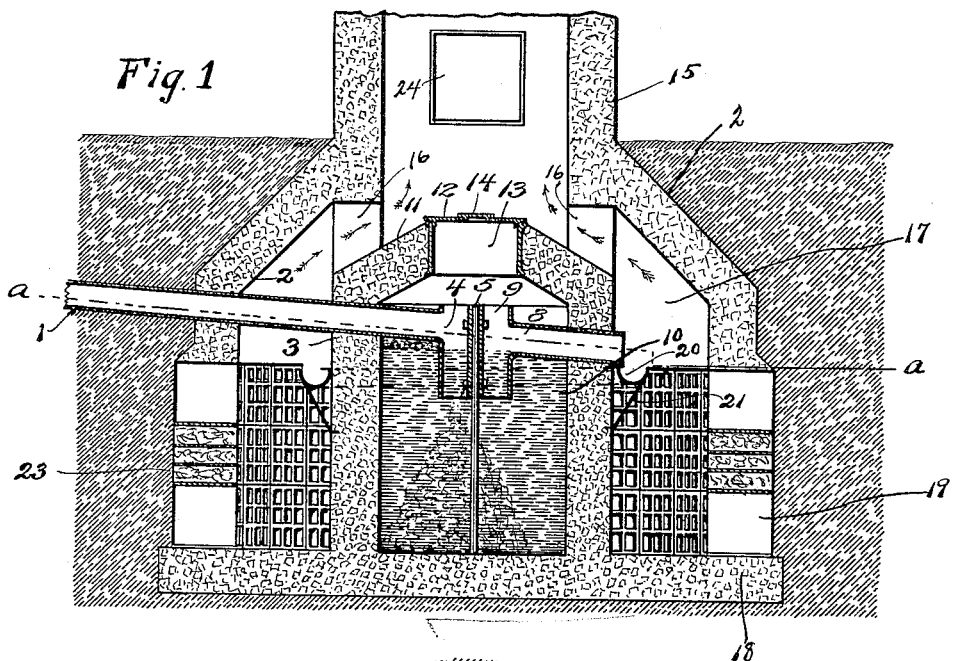
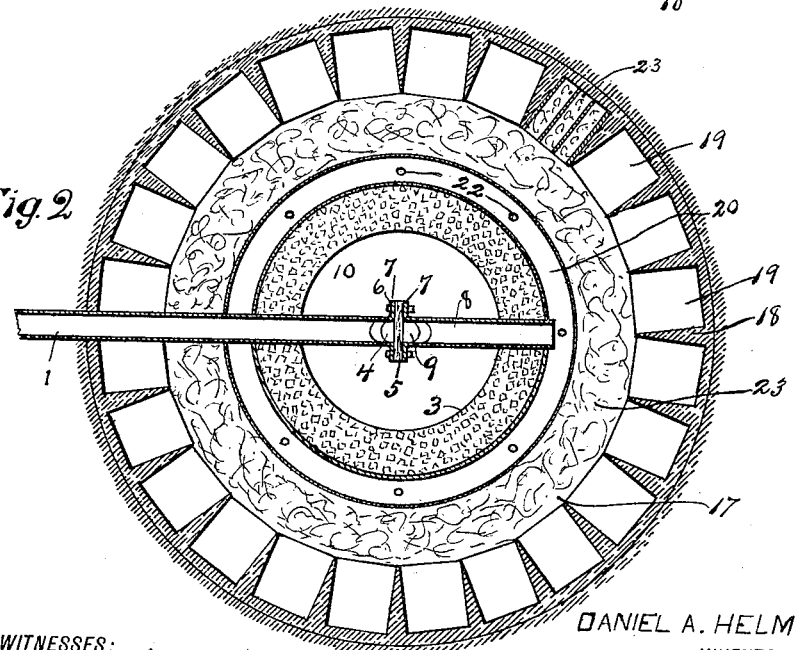

DANIEL A. HELMICH, OF BIRMINGHAM, ALABAMA.

APPARATUS FOR THE PURIFICATION AND DISPOSAL OF SEWAGE.

1,057,642. Specification of Letters Patent. Patented Apr. 1, 1913.

Application filed May 12, 1910. Serial No. 560,852.

*To all whom it may concern:*

Be it known that I, DANIEL A. HELMICH, a citizen of the United States, residing at Birmingham, in the county of Jefferson and State of Alabama, have invented new and useful Improvements in Apparatus for the Purification and Disposal of Sewage, of which the following is a specification.

My invention relates to certain novel improvements in an apparatus for the purification and disposal of sewage.

The chief object which I have in view is the novel arrangement of a filtration bed so that it surrounds the reduction tank thereby effectively preventing the possible leakage and escape of the effluent, containing dangerous anaerobic bacteria propagated within the tank, without passing it through said bed before distributing it into the surrounding soil. A further very important advantage of this novel arrangement of the filtration bed is that the whole apparatus is contained within a relatively small area as contrasted with those systems in which extended bacteria beds are formed by ditches radiating for considerable distances from the reduction tank and filled in with suitable absorbing material. In many cases it is not convenient or practicable to employ elongated beds of this character.

A further object of my invention is to dispose the entire apparatus within one pit or cavity in the earth in the center of which the reduction tank is placed, and to cover the entire pit with a cement or equivalent water-proof cover to protect both the tank and the filtration bed and prevent the latter from becoming flooded or frozen, thereby destroying its effective operation as a bed for the final nitrification and purification of the liquid sewage by the action of the aerobic bacteria.

As a further improvement I use a packing of moss to form the bacteria bed.

A further improvement consists in providing a hollow tile wall for a lining for the chamber containing the bacteria bed, and using such tile wall to partly support a stack for venting the bacteria bed.

My invention further comprises the details of construction and arrangement of parts hereinafter more particularly described and claimed, reference being made to the accompanying drawings in which similar reference numerals refer to similar parts, and in which:—

Figure 1 is a vertical sectional view taken through my improved apparatus. Fig. 2 is a horizontal sectional view taken along the line *a—a* of Fig. 1.

In the preferred form of my apparatus illustrated in the drawings, the sewage from the various points of origin is conducted to a pipe 1 which passes through the outer wall or cover 2 and through the wall 3 near the top of the septic tank and terminates in a downwardly disposed duct 4 which is preferably semi-cylindrical in shape with its end adapted to be bolted or secured to a dashboard 5 by bolts 6 which pass through flanges 7 provided along the side edges of the duct. An outlet pipe 8 passes out through the wall 3 of the tank and at its inner end is provided with a downwardly disposed duct 9 similar to duct 4, and which in like manner to the duct 4 is bolted to the dash-board 5. This dash-board is disposed substantially at the center of the septic tank 10 and is shown of relatively narrow width so that it will not function as a partition in the tank but merely as a baffle, to prevent the direct flow of sewage from the duct 4 to the duct 9, and as a support for the ducts and pipes in the tank. The tank is preferably formed of cement or like composition material, which is impervious so that there is no possibility of the escape of sewage in an unpurified condition into the surrounding earth to pollute same and endanger health. The tank is formed with an integral cover 11 in which a manhole 12 is provided having a cover 13 with a cap 14. A vent pipe 15 is preferably directly supported upon the walls 3 of the tank 10 and is formed of like composition and provided with openings or passages 16 formed above the wall 11 and below the cover wall 2. This cover 2 extends over the aerobic bacteria chamber 17, which surrounds the tank 10 and is provided with an impervious bottom 18 of concrete integral with the inner wall of the chamber 17 formed by the tank wall 3. In fact I prefer to cover the entire bottom of the opening in the earth in which the apparatus is placed, with cement or like composition. An annular wall of hollow tiles 19 rest upon the outer edge of the bottom 18 thus forming a perforated lining or outer wall for the bacteria chamber. The cover wall 2 at its top rests upon and is supported by the tiles 19. The tiles are preferably of the type used for partitions in fire proof buildings and the longitudinal openings therein radiate from the bacteria chamber so as to provide a multiplicity of passages through which the purified sewage passes from said chamber to be absorbed in the earth. The chamber 17 is preferably packed with moss 23, though other suitable substances may be used if desired.

To provide for the proper distribution of the liquid overflow to the pipe 8 from the tank 10, I provide a circular distributing duct 20 which is disposed at an incline and supported by brackets 21 with its higher portion immediately beneath the discharge end of the pipe 8. The brackets 21 are suitably connected to the walls 3 of the tank 10, and support the duct at suitable points. The bottom of the duct is provided with a series of perforations 22.

In operation, the crude sewage flows through the pipe 1 and through duct 4 into the chamber 10, where the solids fall to the bottom of the tank and the liquid rises and passes out through the outlet duct 9 and pipe 8, the openings of both ducts being disposed below the scum or mat which is formed on the surface of the liquid in the tank. The solids distribute themselves over the whole bottom of the tank 10 and the dash-board 5 prevents the direct flow of sewage between the ducts. The sewage flowing out through the duct 8 falls into the duct 20, and either by overflowing same or passing out through the perforations 22, is distributed about the annular bacteria chamber from the top of which the vent stack 15 leads to the open air. Here the sewage spreads itself through the loose material forming the porous filtration bed in said chamber and gradually passes off through the openings in the tiles 19 into the earth and is absorbed. The duct 20 is preferably semi-cylindrical in cross section so as to permit the overflow of sewage under abnormal conditions. The two ducts 4 and 9 are open at the top and access may be had to the septic tank through the manhole 12. Also the bacteria chamber 17 is vented through the ports 16. I provide a door 24, through which access may be had into the stack 15 and to the manhole 12, this door being disposed just above the ground. By providing the opening in the earth with an impervious bottom, I avoid all possibilities of the escape of dangerous sewage which will pollute the surrounding earth. Also by its impervious top and bottom walls the whole apparatus is effectively protected against the access of water which might flood the tank and chamber.

I prefer to arrange the bacteria bed entirely around the septic tank to give the largest possible area therefor within the smallest space about the tank, but obviously the bed may be stopped short of entirely surrounding the tank and such an arrangement is contemplated when I refer to the bed as surrounding "the tank" in this specification and particularly in the claims.

What I claim as new and desire to secure by Letters Patent, is:—

1. In an apparatus for the purification of sewage, the combination of a septic tank disposed beneath the surface of the earth, means to discharge sewage thereinto and withdraw liquefied sewage therefrom from a point below the water line therein, a filtration bed formed of porous material interposed between the side walls of said tank and said cavity, and means to vent said bed by a stack which communicates with the chamber in which said filtration bed is disposed and extends above the surface of the earth and is open to the air.

2. In an apparatus for the purification of sewage, a septic tank disposed beneath the surface of the earth, a filtration bed formed of porous material interposed between the impervious walls of the tank and the surrounding pervious walls of the earth, a cover of impervious material for said tank and bed, and means to vent said bed by a stack connecting with one or more openings in said cover and projecting above the surface of the earth, substantially as described.

3. In an apparatus of the character described, a septic tank disposed beneath the surface of the earth, a filtration bed surrounding said tank and having impervious bottom and inner walls and a perforated outer wall, an impervious cover above said bed, and a stack resting upon said impervious inner wall and projecting above the surface of the earth and connected by suitable openings with said bed, said impervious inner wall of the bed forming the side wall of the septic tank, substantially as and for the purposes described.

4. In an apparatus for the purification and disposal of sewage which is disposed in a cavity beneath the surface of the earth, said apparatus comprising a cement or composition bottom wall for the cavity, a tank having impervious side walls and disposed centrally of said bottom, perforated walls for an outer chamber surrounding said tank, a cover of impervious material for said tank and chamber, means to vent said chamber, a porous filling in said chamber, means to introduce crude sewage into said tank, means to withdraw the liquefied sewage from the tank below the water line, and means to distribute the liquefied sewage through the filling in said surrounding chamber, as and for the purposes described.

5. In an apparatus of the character described, the combination with an earth inclosed septic tank having means for the inlet and outlet of sewage, of a filtration bed formed of porous material in which said tank is buried and an inclined annular distributing trough which receives the fluid discharged from the tank and distributes it to said filtration bed, substantially as described.

6. In an apparatus of the character described, the combination with an earth inclosed septic tank and means to introduce therein and withdraw therefrom sewage, of a filtration bed, said tank being set into said filtration bed so that its side walls form the inner walls of the bed, the outer walls of which are pervious, and an annular trough formed substantially semi-circular in cross section which is disposed in a plane at angles to a horizontal plane and provided with a series of perforations in its bottom, substantially as described.

7. An apparatus for the purification and disposal of sewage which is disposed beneath the surface of the earth and comprises impervious top and bottom walls, a septic tank between said walls, a perforate outer side wall connecting said top and bottom walls and spaced from said tank to form a chamber, a porous bed in said chamber, said top wall having openings into the said chamber, said opening into the tank having a removable door, means in connection with the opening into said chamber to vent said chamber, and means to pass the sewage to be treated first into said tank and then into said porous bed, substantially as described.

8. An apparatus for the purification and disposal of sewage which is disposed in a cavity beneath the surface of the earth, said apparatus comprising an impervious bottom covering for the cavity, a tank of impervious material supported on said bottom substantially centrally of said cavity, an outer hollow tile wall also resting on said bottom and spaced from said tank, an impervious cover for the cavity which is supported on said tile wall and tank, a top for said tank with a normally closed opening therein, a stack extending above the surface of the earth and forming a continuation of said cover and communicating by suitable openings with the compartment formed between the tile wall and the tank, means to deliver and discharge sewage from said tank, and means to treat the discharged sewage in the compartment surrounding the tank, substantially as described.

9. In an apparatus for the purification of sewage, the combination of a filtration reservoir buried beneath the surface of the earth and having an opening exposed to the air above ground, a septic tank set down in said reservoir and surrounded by the filtration material therein, means to deliver the sewage to be treated into said tank, and means to discharge the liquefied sewage from said tank into said reservoir, substantially as described.

10. In an apparatus of the character described, a septic tank disposed in a cavity in the earth and having an imperforate lining, a perforated lining for the walls of said cavity, a filtration bed interposed in the space between the said tank and lining and formed of filtering material, and means to draw off the liquefied sewage from said septic tank into said bed, there being an air passage leading from the cavity in the earth containing the filtering material and being open above ground, as and for the purposes described.

11. In an apparatus of the character described, a septic tank disposed beneath the surface of the earth, a filtration bed composed of filtering material surrounding said tank, a perforated wall between said bed and the surrounding earth, an open air passage leading from the filtration bed to a point above ground and a common protecting cover for the tank and bed, substantially as described.

12. In an apparatus for the purification of sewage, the combination of a septic tank or reduction tank buried beneath the surface of the earth, a filtration reservoir surrounding said tank and having an opening to the air, said filtration reservoir having an outer lining of hollow tile laid in contact with the earth and having their interstices filled with a filtering material for the purpose of affording means of filtration and absorption of the liquid from the said reservoir into the earth.

13. In an apparatus of the character described, a septic tank disposed underground, a filtration bed disposed about the tank, an open air passage leading from said bed to a point above ground, a tile wall disposed about the filtration bed and formed by a series of hollow tiles having the openings therein leading from said bed into the surrounding earth, and a moss filling for the openings in said tiles, substantially as described.

14. In an apparatus for the purification of sewage, a septic or reduction tank buried beneath the surface of the earth, means for ingress and egress of the sewage through ducts extending into said tank at or near the center thereof and below the water line therein, and a narrow dash-board disposed with its vertical center line substantially at the center of the tank and extending to the bottom of the tank, leaving space between its sides and the tank walls, and which prevents the direct flow of sewage from duct to duct while at the same time permitting
5 the organic solids to be deposited substantially uniformly over the bottom of the tank, substantially as described.

In testimony whereof I have hereunto set my hand in presence of two subscribing witnesses.

DANIEL A. HELMICH.

Witnesses:
NOMIE WELSH,
ANNIE L. PEACE.

Copies of this patent may be obtained for five cents each, by addressing the "Commissioner of Patents, Washington, D. C."